United States Patent [19]

Gluys

[11] Patent Number: 5,207,768
[45] Date of Patent: May 4, 1993

[54] TRANSMISSION THRUST WASHER AND LOCKING MEANS THEREFOR

[75] Inventor: James D. Gluys, Portage, Mich.

[73] Assignee: Eaton Corporation, Cleveland, Ohio

[21] Appl. No.: 509,394

[22] Filed: Apr. 16, 1990

[51] Int. Cl.$^5$ ............... F16H 3/08; F16D 13/60; F16D 1/00
[52] U.S. Cl. .................... 74/331; 74/363; 192/109 R; 192/110 S; 192/114 T; 403/355; 403/356; 403/359
[58] Field of Search ............ 74/331, 410, 363; 403/355, 356, 365, 367, 359; 192/109 R, 110 S, 114 T

[56] References Cited

U.S. PATENT DOCUMENTS

| | | | |
|---|---|---|---|
| 2,376,673 | 5/1945 | Duchaussoy | 74/331 X |
| 2,397,905 | 4/1946 | Acton et al. | 308/135 |
| 3,396,554 | 8/1968 | Westercamp | 403/355 X |
| 3,885,446 | 5/1975 | Pengilly | 74/331 |
| 3,894,621 | 7/1975 | Quick | 192/110 R X |
| 3,905,710 | 9/1975 | Cain et al. | 403/356 X |
| 4,008,629 | 2/1977 | Hoepfl et al. | 475/331 |
| 4,034,620 | 7/1977 | McNamara et al. | 74/410 |
| 4,309,140 | 1/1982 | Steffen et al. | 411/264 |
| 4,423,643 | 1/1984 | McNamara | 74/331 |
| 4,485,686 | 12/1984 | Olmstead, Jr. et al. | 74/331 |
| 4,949,589 | 8/1990 | Reynolds | 74/363 |

OTHER PUBLICATIONS

Timoshenko, S., *Strength of Materials*, 1958, pp. 313-314 of part II.

*Primary Examiner*—Leslie A. Braun
*Assistant Examiner*—David E. Henn
*Attorney, Agent, or Firm*—A. E. Chrow

[57] ABSTRACT

An improved elongate key (92) is provided for securing thrust washers to a mainshaft (48) of a transmission (100). Key (92) has a substantially triangular cross-sectional configuration having rounded intersections between adjacent surfaces rendering it easily insertable axially through keyways defined between external axially extending grooves (66) in mainshaft (48) and aligned internal grooves (86) in the thrust washer which itself is preferably provided with rounded corners (90) to enhance the strength thereof.

9 Claims, 3 Drawing Sheets

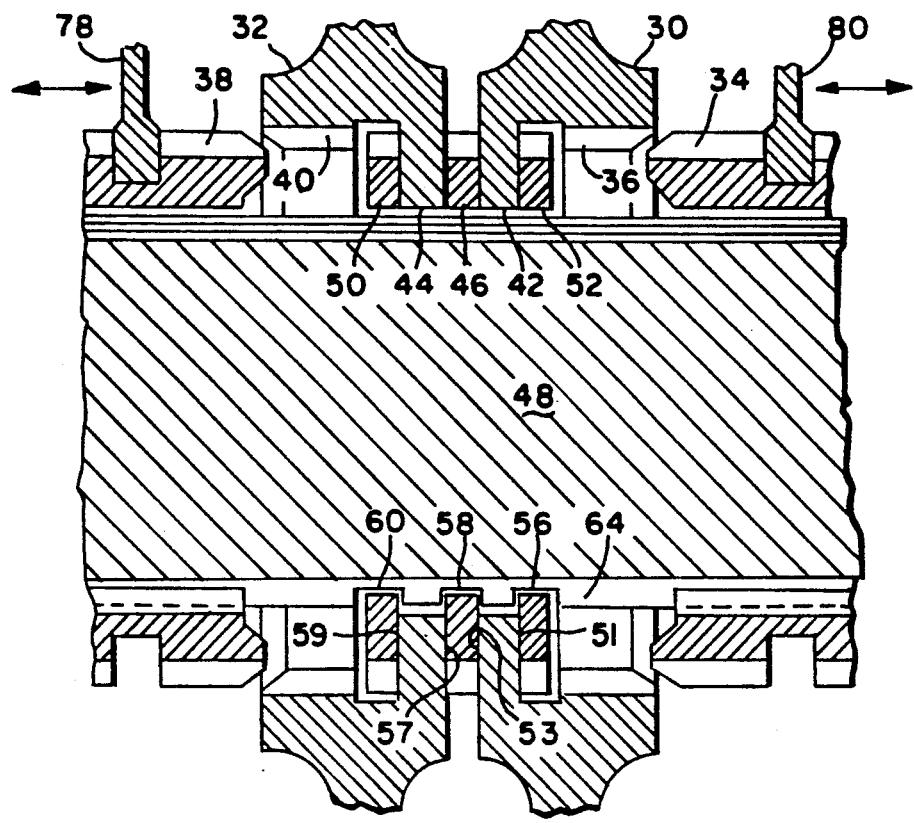
PRIOR ART
Fig. 2
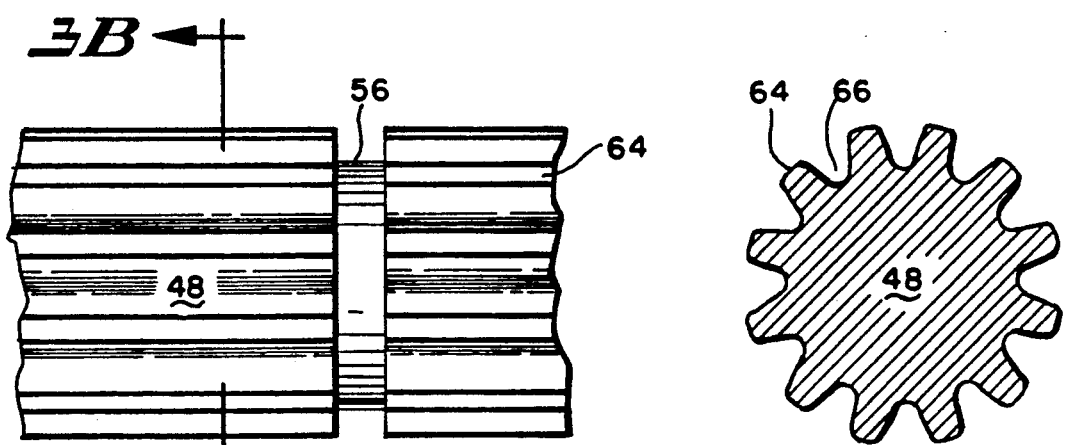
PRIOR ART
Fig. 3A
PRIOR ART
Fig. 3B

TRANSMISSION THRUST WASHER AND LOCKING MEANS THEREFOR

INTRODUCTION

This invention relates generally to the combination of a thrust washer adapted to be axially secured to a mainshaft of a transmission by means of a key and more particularly to a transmission of the type featuring floating mainshaft gears and the key is provided with an improved cross-sectional configuration for securing the thrust washer to the mainshaft.

BACKGROUND OF THE INVENTION

Transmissions featuring floating transmission mainshaft gears such as associated with twin countershaft transmissions are well known and of which examples can be found in U.S. Pat. Nos. 3,237,472; 3,283,613; 3,425,290; and 3,885,446, the disclosures of which are incorporated herein by reference.

Such transmissions generally feature a plurality of floating mainshaft gears that encircle the mainshaft and are supported and driven by countershaft gears that are mounted on a pair of counter-shafts disposed on opposite sides of the mainshaft in substantial parallel spaced-apart relationship thereto.

The mainshaft gears are characteristically clutched to the mainshaft by means of a clutch mechanism that slides along external splines or flutes extending axially along the mainshaft and has radially outwardly extending teeth to engage internal teeth on the mainshaft gear so as to cause rotation of the mainshaft when the mainshaft gear being clutched thereto is rotatably driven. A problem long ago recognized has been the potential transfer of axial thrust between closely adjacent mainshaft gears when one of the mainshaft gears is being clutched to the mainshaft by a clutch mechanism moving axially toward both gears. In view of such, a variety of solutions have been devised over past years for the transmitting axial thrust imparted by an axially moving clutch to the mainshaft rather than to the gear adjacent the gear being clutched to the mainshaft.

Such solutions have generally been in the form of gear retainer(s) or thrust washers of one type or another that characteristically limit axial movement of the mainshaft gears to prevent them from engaging each other whether or not one of them is being clutched to the mainshaft.

One example of a retainer assembly for limiting axial movement of a transmission gear is disclosed in U.S. Pat. No. 2,397,905, the disclosure of which is incorporated herein by reference. Here however, a costly pivotal woodruff key is required to lock a thrust collar onto external splines of the mainshaft to prevent a gear from moving axially.

An example of a splined thrust washer for transmitting axial thrust from a gear set to a propeller drive shaft is disclosed in U.S. Pat. No. 3,894,621, the disclosure of which is incorporated herein by reference. Here, a splined thrust washer (52) is slid axially along the shaft splines to a transverse groove adjacent a stepped shoulder on the shaft and is held in place against the shoulder by splined collar (30). Thrust washer (52) is operative to transmit axial thrust of only one gear to the propeller shaft and, in addition to requiring the use of collar (30), also requires costly and complex machining of a stepped configuration to the propeller shaft exterior.

A more recent example of a transmission mainshaft gear retainer or thrust washer for preventing axial movement of two closely spaced gears to prevent transfer of axial thrust force therebetween is disclosed in U.S. Pat. No. 4,034,620, the disclosure of which is incorporated herein by reference. Here a thrust ring (104) is splined to the mainshaft between two adjacent gears and is held in place by means of snap rings (108, 110) on opposite sides thereof. The gears are further required to have costly and complex mating tongue and groove configurations that operate in conjunction with an additional snap ring (102) to limit movement of the gears away from each other.

An even more recent example of a particular arrangement of thrust washers that are secured to a splined transmission mainshaft by means of an elongate key is disclosed in copending application U.S. Ser. No. 329,134, filed Mar. 27, 1989, now U.S. Pat. No. 4,949,589, issued Aug. 21, 1990, assigned to the assignee of the present invention.

The instant invention addresses a problem presently existing with thrust washers that are provided with grooves in an annular surface surrounding an opening through which the mainshaft is received that, when in substantial alignment with corresponding axially extending grooves in the exterior surface of the mainshaft, define a keyway through at least one of which an elongate key is inserted to secure the thrust washer to the mainshaft but which heretofore has been provided with a cross-sectional configuration rendering it not only difficult to insert through the keyway but also providing the possibility of creating stress risers in the corners of the grooves when improperly inserted therethrough.

SUMMARY OF THE INVENTION

Accordingly, it is an object of this invention to provide an improved elongate key for securing a thrust washer to a transmission mainshaft.

It is another object of this invention to provide in combination a thrust washer and an improved key adapted to secure the thrust washer to a transmission mainshaft in a simple and effective manner.

It is still another object of this invention to provide an improved elongate key having a cross-sectional configuration adapted to enhance the securement of a thrust washer to a transmission mainshaft.

BRIEF DESCRIPTION OF THE DRAWINGS

FIG. 2 is an enlarged cross-sectional view through a section of prior art mainshaft 48 of FIG. 1;

FIG. 3A is a side view of the exterior of a section of prior art mainshaft 48 of FIGS. 1 and 2;

FIG. 3B is an end view of prior art mainshaft 48 of FIG. 3A;

DESCRIPTION OF SOME PREFERRED EMBODIMENTS

Figure 1:
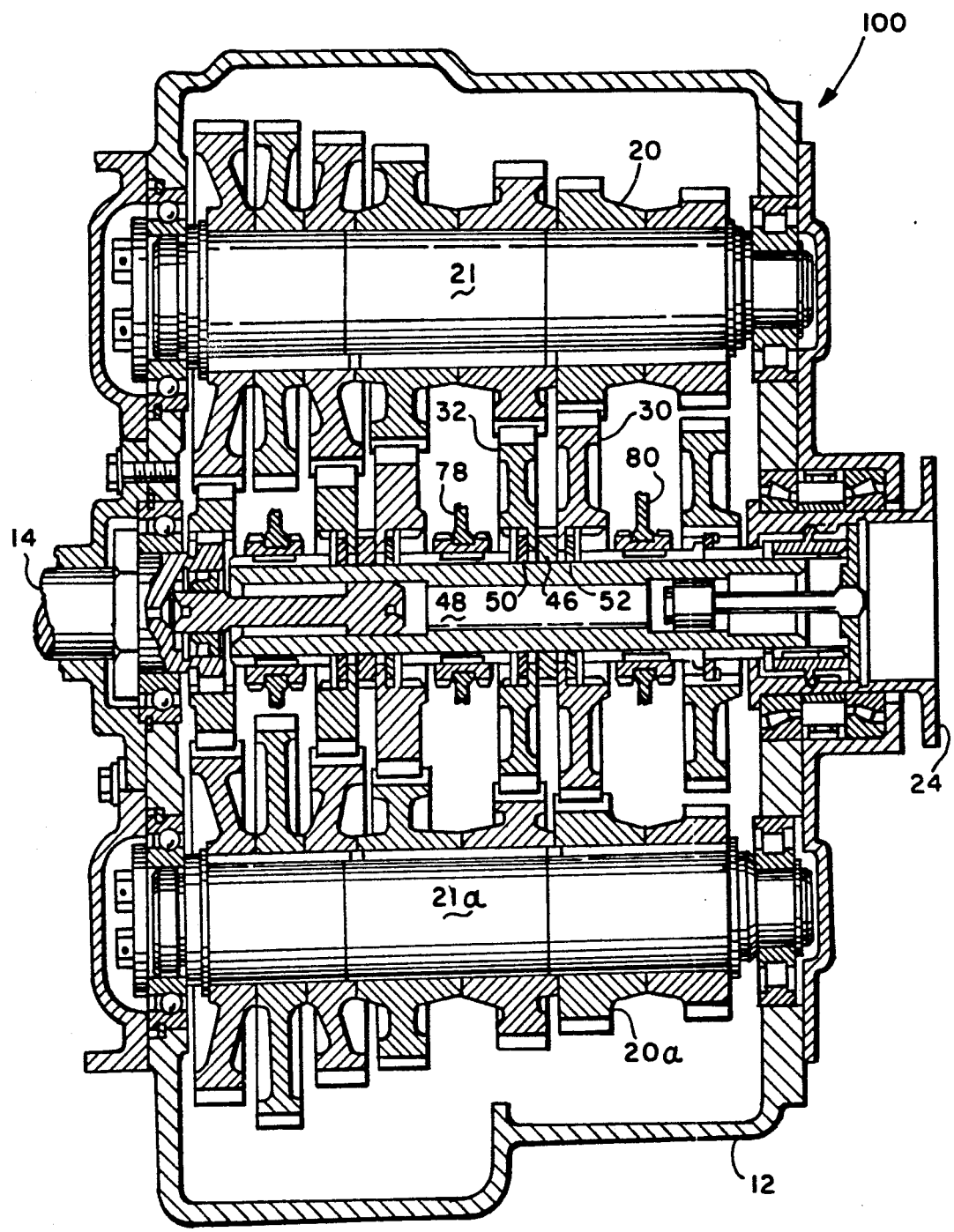
FIG. 1 is a central cross-sectional view of a prior art twin countershaft transmission 100 that has thrust washers 46, 50 and 52 secured to a mainshaft 48.

FIG. 1 is a Cross-sectional view of an embodiment of vehicular twin countershaft transmission 100. Transmission 100 has a pair of countershafts 21 and 21a disposed on opposite sides of mainshaft 48. Countershafts 21 and 21a are journaled for rotation on frame or housing 12 of transmission 100 and are in substantial parallel spaced-apart relationship to mainshaft 48. Countershafts 21 and 21a carry respective countershaft gears 20 and 20a that meshingly engage mainshaft gear 30 and enables it to float about mainshaft 48 until clutched thereto by axially slidable clutch mechanism 80. Similarly, countershaft gears 23 and 23a are meshingly engaged with mainshaft gear 32 and enable it to float about mainshaft 48 until clutched thereto by axially slidable clutch mechanism 78.

Rotation of input shaft 14 such as by a vehicular engine causes countershafts 21 and 21a and their respective gears 20 and 20a to rotate which causes mainshaft gears 30 and 32 to rotate freely about mainshaft 48 until clutched thereto by clutch mechanisms 78 and 80 which then causes output shaft 24 to rotate at a rotational speed determined by the particular mainshaft gear being clutched to mainshaft 48.

Also shown in FIG. 1 are three thrust washers 46, 50 and 52 that are grooved thrust washers and are secured to mainshaft 48 by means of a key and which are illustrative of the use of such thrust washers for transmitting axial thrust of the mainshaft gear being clutched to the mainshaft rather than to an adjacent gear.

FIG. 2 is an expanded cross-sectional view of a section of mainshaft 48 providing greater detail relative certain elements of transmission 100 Previously described and in particular where clutch mechanisms 78 and 80 are provided with respective teeth 38 and 34 for engaging teeth 40 and 36 respectively of countershaft gears 32 and 30.

Also shown are thrust surfaces 51 and 53 on gear 30 and thrust surfaces 57 and 59 on gear 32 that are respectively adapted to engage the thrust washer in adjacent facing relationship thereto for transmitting axial thrust to the mainshaft.

Also shown are annular grooves 56, 58 and 60 that respectively extend about the outer surface of mainshaft 48 and are in substantial transverse relationship to axially extending splines 64 in the outer surface of mainshaft 48. Grooves 56, 58 and 60 respectively enable thrust washers 52, 46 and 50 to be rotated once they have been slid along the grooves between adjacent splines 64 into respective registration therewith so that the grooves between the splines on mainshaft 48 are in alignment with the grooves in the thrust washer(s) as hereinafter described so as to define a keyway therebetween through at least one of which an elongate key can be inserted for securing the thrust washer to the mainshaft.

FIGS. 3A and 3B respectively show a side view and an end view of a section of mainshaft 48 of FIGS. 1 and 2 to show in greater detail one of transverse grooves (groove 56) and also to illustrate that splines 64 are disposed in a substantially circumferentially equi-distant array about the outer surface of mainshaft 48 with adjacent splines 64 being separated by axially extending grooves 66.

Figure 4:
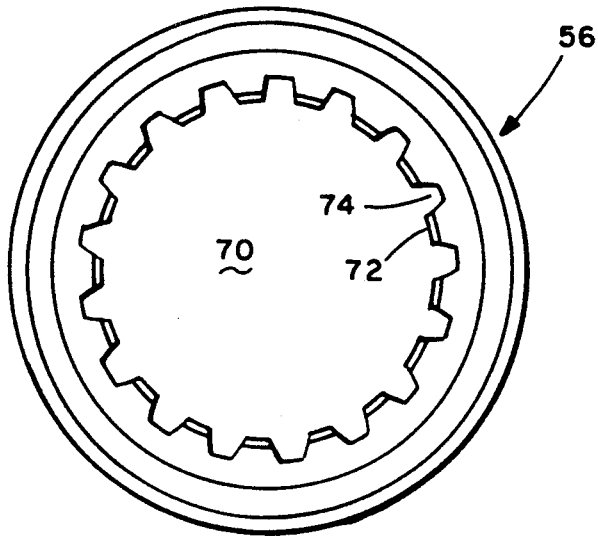
FIG. 4 is a front view of a prior art transmission mainshaft thrust washer.
Figure 5:
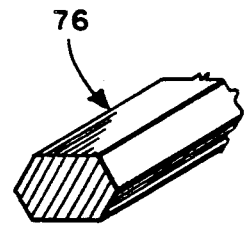
FIG. 5 is a cross-sectional view of an elongate prior art key adapted to secure the thrust washer of FIG. 4 to the transmission mainshaft.

FIG. 4 shows a front view of the thrust washer 46 of FIG. 2 which is essentially the same as the front views of thrust washers 50 and 52 and illustrates that it features an opening 70 adapted to receive mainshaft 48 therethrough surrounded by a surface having a corresponding substantially circumferentially equi-distant array of grooves 74 separated by teeth 72. Teeth 72 are adapted to be received in mainshaft 48 grooves 66 (FIG. 3B) and enable thrust washer 46 to be slid axially therealong until in registration with one of the transverse grooves and thence rotated to align grooves 74 with grooves 66 to define respective keyways through at least one of which an elongate key 76 shown in FIG. 5 is inserted, to secure thrust washer 46 to mainshaft 48.

Keys, such as key 76, heretofore used for securing thrust washers to transmission mainshafts have characteristically had a flattened hexagonal cross section having relatively sharp axially extending intersections between adjacent surfaces and have been found to be difficult to insert through the keyways previously described and have had to be precisely oriented before they would slide through the keyway since their cross-sectional area was required to occupy a substantial portion of the cross-sectional area of the keyway to ensure a tight fit and, if improperly inserted through the keyway, the sharp intersections were apt to impinge upon the corners of the grooves to create the possibility of stress risers thereat.

Figure 6A:
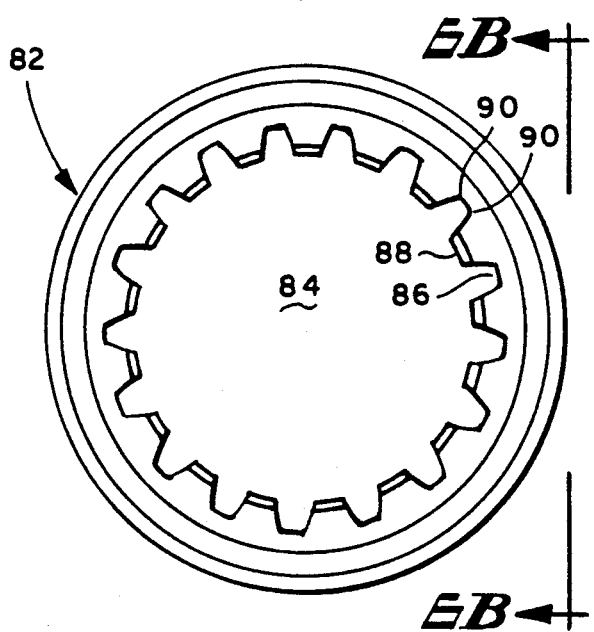
FIG. 6A is a front view of a preferred embodiment of a transmission mainshaft thrust washer.
Figure 6B:
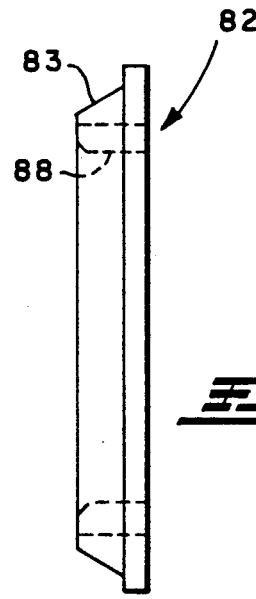
FIG. 6B a side view of the thrust washer of FIG. 6A.
Figure 7:
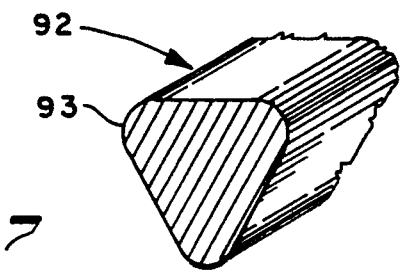
FIG. 7 is a cross-sectional view of a preferred embodiment of an elongate key for securing the thrust washers of FIGS. 4 and 6A to a transmission mainshaft.

FIGS. 6A and 6B show preferred embodiment 82 of a thrust washer for use in conjunction with an embodiment 92 of the improved key of the invention shown in FIG. 7.

Thrust washer 82 has an opening 84 that is adapted to receive a transmission mainshaft therethrough and is surrounded by a surface having a substantially circumferentially equi-distant array of grooves 86 separated by teeth 88 as previously described for thrust washer 46 of FIG. 4. However, thrust washer 82 differs from prior art thrust washer 46 by having intersections 90 between the opposed side walls and bottom surfaces of grooves 86 that are rounded intersections in preference to the relatively sharp intersections between the opposed side walls and bottom surface of grooves 74 as shown in FIG. 4 to enhance strength thereat and are advantageously adapted to receive the cross-sectional configuration of key 92 of FIG. 7 hereinafter described.

The rounded intersections characteristically have a radius of curvature that is at least about one-half that of prior art thrust washers such as where the intersections between the opposed side walls and bottom surface of the prior art thrust washer grooves have a radius of curvature of about 0.030 inch and that of the preferred thrust washer is about 0.060 inch.

FIG. 6B shows a preferred embodiment of a side view configuration of thrust washer 82 where it has an annularly inwardly tapering ramp 83 to provide teeth 88 with longer axial length while keeping the size of the thrust washer to a minimum.

Key 92 of FIG. 7 is a marked departure from keys such as key 76 heretofore used to secure thrust washers to transmission shafts for it features a substantially triangular cross-sectional configuration adapted to be received through the keyway defined between the aligned mainshaft and thrust washer grooves hereinafter described that is also preferably provided with rounded intersections between adjacent surfaces such as indicated by reference numeral 93 in FIG. 7 to provide a troicoid type cross-sectional configuration.

It has been found that a key having a substantially triangular cross-sectional configuration and preferably having rounded intersections and adapted to secure the thrust washer to the transmission mainshaft can be inserted through the keyways defined between the aligned thrust washer and transmission mainshaft grooves with relative ease without the time consuming precise orientation required of prior art keys used for such purposes in the past and is further advantageously adapted to enable the corners of the thrust washer grooves to be rounded to increase the strength of the thrust washer thereat.

What is claimed is:

1. An improved key for securing a thrust washer to a transmission mainshaft, said mainshaft having at least one axially extending groove in the outer surface thereof, said thrust washer having an opening that is adapted to receive the mainshaft therethrough and is surrounded by a surface having at least one groove therein that is registerable with the mainshaft groove and that when in registration therewith upon receipt of the mainshaft therethrough defines a keyway therebetween, said improvement characterized by said key having a substantially triangular cross-sectional configuration adapted to be received through the keyway and secure the thrust washer to the mainshaft.

2. The improved key of claim 1 wherein the intersection between adjacent sides of the triangular configuration are rounded intersections.

3. The improved key of claim 1 or 2 wherein the intersection between opposed side walls and bottom surface of the thrust washer grooves are rounded intersections.

4. The improved key of claim 1 or 2 wherein the mainshaft has a plurality of said axially extending grooves disposed in a substantially circumferentially equi-distant array about the outer surface thereof and has at least one annular groove disposed in the outer surface thereof in substantial transverse relationship to the array of axially extending mainshaft grooves, the thrust washer has a corresponding array of grooves in said surrounding surface that are respectively registerable with the mainshaft grooves.

5. In a transmission, the combination of at least one keyway and at least one key for securing a thrust washer to a mainshaft of the transmission, said mainshaft having at least one axially extending groove in the outer surface thereof, said thrust washer having an opening that is adapted to receive the mainshaft therethrough that is surrounded by a surface having at least one groove therein that is registerable with the mainshaft groove and that when in registration therewith upon receipt of the mainshaft therethrough defines a keyway therebetween, and said key having a substantially triangular cross-sectional configuration adapted to be received through the keyway to secure the thrust washer to the mainshaft.

6. The transmission of claim 5 wherein the intersection between adjacent sides of the triangular cross-sectional configuration are rounded intersections.

7. The transmission of claim 5 or 6 wherein the intersections between opposed sidewalls and bottom surface of the thrust washer groove are rounded intersections.

8. The transmission of claim 5 or 6 wherein the mainshaft has a plurality of said axially extending grooves disposed in a substantially circumferentially equi-distant array about the outer surface thereof and at least one annular groove disposed in the outer surface thereof in substantial transverse relationship to the array of axially extending mainshaft grooves, said thrust washer has a corresponding array of grooves in said surrounding surface that are respectively registerable with the mainshaft grooves.

9. In a transmission, the combination of a plurality of keyways and at least one key for securing a thrust washer to a mainshaft of the transmission, said mainshaft having a plurality of axially extending grooves disposed in a substantially circumferentially equi-distant array in the outer surface thereof and having at least one annular groove disposed in the outer surface thereof that is in substantial transverse relationship to the axially extending grooves, said thrust washer having an open end for receiving the mainshaft therethrough surrounded by a surface having a corresponding array of grooves therein having rounded intersections between the opposed sidewalls and the bottom surface respectively thereof and that are respectively registerable with the mainshaft grooves, said key having a substantially triangular cross-sectional configuration having rounded intersections between adjacent side thereof and adapted to be received through at least on of the keyways to secure the thrust washer to the mainshaft.

* * * * *